United States Patent [19]

Barbee et al.

[11] 4,436,895

[45] Mar. 13, 1984

[54] POLYESTER CONTAINERS HAVING IMPROVED GAS BARRIER PROPERTIES

[75] Inventors: Robert B. Barbee; Burns Davis, both of Kingsport, Tenn.

[73] Assignee: Eastman Kodak Company, Rochester, N.Y.

[21] Appl. No.: 484,401

[22] Filed: Apr. 13, 1983

[51] Int. Cl.$^3$ .................... C08G 63/44; C08G 63/68
[52] U.S. Cl. .................... 528/288; 528/173; 528/176; 528/190; 528/194; 528/293; 528/302; 528/308.6
[58] Field of Search ............ 528/288, 293, 302, 308.6, 528/173, 176, 190, 194

[56] References Cited

U.S. PATENT DOCUMENTS

| | | | |
|---|---|---|---|
| 3,931,114 | 1/1976 | Gall et al. ..................... | 528/308.6 X |
| 4,076,693 | 2/1978 | Go .................................... | 528/302 X |
| 4,403,090 | 9/1983 | Smith ........................... | 528/308.6 X |

*Primary Examiner*—Lucille M. Phynes
*Attorney, Agent, or Firm*—David E. Cotey; Daniel B. Reece, III

[57] ABSTRACT

The present invention provides containers having improved resistance to gas permeability. The containers are formed from a polyester resin which comprises the reaction product of a diol containing up to about 8 carbon atoms and a diacid component which comprises terephthalic acid and a second diacid selected from iminodiacetic acid, oxydiacetic acid, thiodiacetic acid, and mixtures thereof. The second diacid is present in a concentration of about 1 to 50 mole percent, based upon the total amount of diacid. The polyester resin has an inherent viscosity of about 0.5 to 1.5. A preferred polyester is that derived from ethylene glycol, terephthalic acid, and oxydiacetic acid. The containers which are provided by the present invention may be in the form of sheet, film, molded articles, such as bottles, and other such structures.

11 Claims, No Drawings

POLYESTER CONTAINERS HAVING IMPROVED GAS BARRIER PROPERTIES

DESCRIPTION

BACKGROUND OF THE INVENTION

The present invention relates to packages for protecting comestibles. More specifically, it relates to films and molded containers which are formed from polyesters.

Presently there is a strong interest in the packaging industry for protecting comestibles (such as foodstuffs, medicines, and especially carbonated beverages) by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While molded containers formed from polyethylene terephthalate have, as indicated, many desirable characteristics, there is a need in the art to provide improved polyester containers which will have gas permeabilities which are lower than those of containers formed from polyethylene terephthalate. Such improved containers would be much more versatile in their utilization and allow the containers to be used to package substances for which the polyethylene terephthalate containers may not be suitable.

The present invention provides such an improved container. The container of the present invention is formed from a polyester resin which incorporates diacid units derived from iminodiacetic acid, oxydiacetic acid, or thiodiacetic acid.

U.S. Pat. No. 3,991,035 discloses a process for preparing filaments of a linear glycol terephthalic polyester. The process comprises modifying the polyester by incorporating therein units which may be derived from iminodiacetic acid and thiodiacetic acid. A comparative example also discloses polyesters which incorporate oxydiacetic acid. However, there is no disclosure nor suggestion in this patent specification that such polyesters can be formed into sheet, film, or molded articles. Because such articles could not be known or contemplated from a reading of this disclosure, there is likewise no disclosure nor suggestion of the improved gas barrier properties which make containers formed from these or related compositions useful in the packaging industry.

It has now been found that containers which are formed from specified polyester compositions exhibit desirable physical properties, including improved gas barrier properties, which render them advantageous for use in the packaging of comestibles.

SUMMARY OF THE INVENTION

The present invention provides containers having improved resistance to gas permeability. The containers are formed from a polyester resin comprising the reaction product of
(A) a diol containing up to about 8 carbon atoms, and
(B) a diacid component comprising
 (i) terephthalic acid and
 (ii) a second diacid selected from iminodiacetic acid, oxydiacetic acid, thiodiacetic acid, and mixtures thereof, wherein said second diacid is present in a concentration of about 1 to 50 mole percent, based upon the total amount of diacid, and wherein said polyester resin has an inherent viscosity of about 0.5 to 1.5.

DETAILED DESCRIPTION OF THE INVENTION

The invention described herein relates to containers formed from specified polyester resin compositions. As used herein, the term "container" is intended to mean shaped articles formed from a specified polyester which are suitable for use in packaging comestibles. Such shaped articles include sheets and films which are extruded from the polyester and which may be used as barrier layers, container liners, as components of laminates or other composites, etc. Such shaped articles also include molded containers, such as bottles.

The polyester from which the containers of the present invention are formed comprises the reaction product of a diol component and a diacid component. The diol component comprises one or more diols containing up to about 8 carbon atoms. Examples of such diols include ethylene glycol; 1,4-butanediol; 1,4-cyclohexanedimethanol; propylene glycol; diethylene glycol; 2,2,4-trimethyl-1,3-pentanediol; 2,2-dimethyl-1,3-propanediol; 2,2-diethyl-1,3-propanediol; 2-methyl-2-propyl-1,3-propanediol; 1,3-butanediol; 1,5-pentanediol; 1,6-hexanediol; 1,2-cyclohexanedimethanol; 1,3-cyclohexanedimethanol; 2,2,4,4-tetramethyl-1,3-cyclobutanediol; o-, m-, and p-xylylene diols; etc. The diol component is preferably selected from ethylene glycol, 1,4-butanediol, and 1,4-cyclohexanedimethanol, and is more preferably selected from ethylene glycol and 1,4-butanediol. Most preferably, the diol component comprises ethylene glycol. Additionally, minor amounts (i.e., less than about 50 mole percent, and, preferably, less than about 10 mole percent, based on the total amount of diol present in the polyester) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3-propanediol; 2,2,4-trimethyl-1,6-hexanediol; 4,4'-sulfonyldiphenol; 4,4'-oxydiphenol; 4,4'-isopropylidenediphenol; 2,5-naphthalenediol; and other well known polyester-forming diols.

The polyester resin further comprises a diacid component. The diacid component comprises terephthalic acid and a second diacid selected from iminodiacetic acid, oxydiacetic acid, thiodiacetic acid, and mixtures thereof. Again, other well-known polyester-forming diacids may be employed in minor amounts (i.e., in amounts less than about 50 mole percent, and, preferably, less than about 10 mole percent, based on the total amount of diacid present in the polyester). Such diacids may include, for example, isophthalic acid, 1,4-cyclohexanedicarboxylic acid, linear lower alkyl dicarboxylic acids, etc. The diacid component may also include acid halides and esters, particularly the lower alkyl ($C_1$–$C_4$) esters of the acids mentioned.

The second diacid, which is selected from iminodiacetic acid (N-(carboxymethyl)-glycine), oxydiacetic acid (diglycolic acid; 2,2'-oxybisacetic acid), thiodiacetic acid (2,2'-thiobisacetic acid), and mixtures thereof, is present in the polyester in a concentration of about 1 to 50 mole percent, based upon the total amount of diacid present in the polyester. In preferred embodiments, the second diacid is present in an amount of about 5 to 40 mole percent. When the polyester is to be formed into a sheet or film, the second diacid is more preferably present in an amount of about 10 to 40 mole percent; when a molded container, such as a bottle, is desired, the second diacid is more preferably present in an amount of about 10 to 20 (e.g., about 15) mole percent.

The polyester which is employed in the present invention exhibits an I.V. of about 0.5 to 1.5. The I.V. is measured at 25° C. in a 60/40 by weight mixture of phenol/tetrachloroethane at a concentration of 0.5 g/100 ml. Polymers having an I.V. within the range specified above are of sufficiently high molecular weight to be used in the formation of the containers described above.

The polyesters which are employed in the present invention are synthesized by methods generally known in the art for producing polyesters. The reactants may all be reacted in a single operation or, alternatively, sequential operation may be employed. Temperatures which are suitable for forming the polyesters generally range between about 180° C. and about 295° C., with the preferred range being about 200° to 285° C. The reaction may be conducted under an inert atmosphere, such as nitrogen. Preferably, the final stage of the polyester synthesis is conducted under a vacuum.

Conventional catalysts are employed in the preparation of the polyester. For example, polymerization can be effected in the presence of catalytic amounts of transition metal compounds, such as antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalysts will be present in an amount of about $10^{-5}$ to $10^{-3}$ moles of catalyst per mole of total acid employed.

Of course, suitable additives, such as dyes, pigments, plasticizers, fillers, antioxidants, stabilizers, etc., may be employed in conventional amounts. Such additives may be added directly to the reaction or may be added to the final polymer.

The polyesters described above may be formed into the containers of the present invention by conventional plastic processing techniques. For example, sheets, films, and other like structures can be formed by well-known extrusion techniques.

Film or sheet material made from the compositions of the present invention is strong, flexible, and clear. it may be formed into articles such as wrappers, bags, and the like.

The polyesters may also be used to form a laminating layer between two or more permeable layers of film. The polyesters may also be used for dip coating containers from a polymer solution in order to improve the barrier properties of a package.

Molded containers can be made from the above-described polyester by compression molding, blow molding, and other such molding techniques, all of which are well known in the art. The containers which are the preferred embodiment of the invention are biaxially oriented blow-molded containers.

The above-described containers of the present invention are ideally suited for protecting comestibles, like foodstuffs (especially carbonated soft drinks), medicines, and like substances. The advantages of these container materials are due to low oxygen and carbon dioxide permeability relative to polyethylene terephthalate.

Because of the decreased gas transmission rates of these polyesters, they perform well in packaging applications where greater gas barrier properties are required, such as salad oils and dressings, as well as relish and other food items. Typically, the containers of the present invention exhibit an oxygen permeability of less than about 8, measured as cubic centimeters permeating a 1 mil thick sample, 100 inches square, for a 24 hour period under an oxygen partial pressure difference of 1 atmosphere at 30° C., and a carbon dioxide permeability less than about 40 (same basis).

The invention will be further illustrated by the following examples, although it will be understood that these examples are included merely for purposes of illustration and are not intended to limit the scope of the invention.

EXAMPLE 1

This example illustrates the improved gas barrier properties of containers formed of polyethylene terephthalate which has been modified with 10 mole percent of iminodiacetic acid.

A reaction vessel was charged with 23.12 grams of dimethyl terephthalate, 1.76 grams of iminodiacetic acid, 24.63 grams of ethylene glycol, and 100 ppm of titanium from titanium tetraisopropoxide. The reaction mixture was heated and stirred under nitrogen at 200° C. for 60 minutes. The temperature was then increased to 210° C. for 120 minutes until all of the methanol had distilled out of the reaction mixture. The temperature was then raised to 275° C., the nitrogen was evacuated from the reaction system, and a vacuum was applied. The melt condensation was continued at 275° C. for 60 minutes under 0.5 mm Hg pressure. The heating was discontinued, the reaction mixture was brought to atmospheric pressure with nitrogen, and the polymer was collected. The polymer had an inherent viscosity of 0.73.

The oxygen permeability of the polyester was determined in cubic centimeters permeating a 1 mil thick sample, 10 inches square, for a 24-hour period under an oxygen partial pressure difference of one atmospheric at 30° C. using a MOCON Oxtran 100 instrument. The polyester was extruded into film using a Brabender extruder at 240°-260° C. The film actually used to measure permeability was 3-8 mils in thickness, but the permeability was converted to a one mil basis using conventional calculations.

The results are given in Table I.

EXAMPLE 2

Example 1 was repeated except that 10 mole percent of oxydiacetic acid was used in place of iminodiacetic acid. The resulting polymer had an I.V. of 0.76. The oxygen permeability of the polyester was measured as in Example 1, and the results are given in Table I.

EXAMPLE 3

Example 1 was repeated except that the iminodiacetic acid was replaced with 10 mole percent of thiodiacetic acid. The resulting polymer had an I.V. of 0.76. The oxygen permeability of the polyester was measured as described in Example 1, and the results are given in Table I.

TABLE I

| Example | Mole % | Oxygen Permeability |
|---|---|---|
| 1 - Iminodiacetic acid | 10 | 6.1 |
| 2 - Oxydiacetic acid | 10 | 6.8 |
| 3 - Thiodiacetic acid | 10 | 6.6 |
| PET Control | — | 10.5 |

It can be seen from a review of the data of Table I that films prepared from each of the polyesters of Examples 1–3 provide reduced oxygen permeability as compared to polyethylene terephthalate. These polyesters provide a balance of good physical properties which, in combination with their reduced oxygen permeabilities, render advantageous their use as containers.

EXAMPLE 4

Example 2 was repeated except that 20 mole percent of oxydiacetic acid was employed. The resulting polymer had an I.V. of 1.13. The oxygen permeability of the polymer was measured as in Example 1. In addition, the glass transition temperature was measured using a Perkin-Elmer DSC-2 Differential Scanning Calorimeter at a heating rate of 20° C. per minute. The results are given in Table II.

EXAMPLE 5

Example 2 was repeated except that 50 mole percent of oxydiacetic acid was employed. The resulting polymer had an I.V. of 0.72. The oxygen permeability of the polyester was determined as described in Example 1, and the glass transition temperature was determined as in Example 4. The results are given in Table II. Table II also reports the glass transition temperature of the polyester described above in Example 2.

TABLE II

| Example | Oxydiacetic Acid mole % | Oxygen Permeability | $CO_2$ Permeability | Tg, °C. |
|---|---|---|---|---|
| PET Control | — | 10.5 | 59 | 75 |
| 2 | 10 | 6.8 | 35 | 66 |
| 4 | 20 | 6.2 | 22 | 57 |
| 5 | 50 | 4.2 | — | 25 |

The carbon dioxide permeability of the polymers reported in Examples 2 and 4 and of the PET control was determined in cubic centimeters permeating a 1 mil thick sample, 10 inches square, for a 24-hour period under a carbon dioxide partial pressure difference of one atmosphere at 30° C. A MOCON Permatran C instrument was employed.

It can be seen from the data of Table II that the containers of the present invention provide reduced oxygen and carbon dioxide permeability as compared to that exhibited by the polyethylene terephthalate control.

It will be noted that certain of the described polyester compositions (such as in Example 5) exhibit a glass transition temperature which is undesirably low for the formation and use of molded containers. However, such compositions are nevertheless advantageously employed in the form of sheets, films, laminates, etc.

While the invention has been described in detail with particular reference to preferred embodiments thereof, it will be understood that variations and modifications can be effected within the spirit and scope of the invention.

We claim:

1. A container formed from a polyester resin comprising the reaction product of
    (A) a diol containing up to about 8 carbon atoms, and
    (B) a diacid component comprising
        (i) terephthalic acid and
        (ii) a second diacid selected from iminodiacetic acid, oxydiacetic acid, thiodiacetic acid, and mixtures thereof, wherein said second diacid is present in a concentration of about 1 to 50 mole percent, based upon the total amount of diacid, and wherein said polyester resin has an inherent viscosity of about 0.5 to 1.5.

2. The container of claim 1 wherein said diol comprises ethylene glycol, 1,4-butanediol, 1,4-cyclohexanedimethanol, or a mixture thereof.

3. The container of claim 1 wherein said diol comprises ethylene glycol.

4. The container of claim 1 wherein said diol comprises 1,4-butanediol.

5. The container of claim 1 wherein said diol comprises 1,4-cyclohexanedimethanol.

6. The container of claim 1 wherein said second diacid comprises oxydiacetic acid.

7. The container of claim 1 wherein said second diacid is present in a concentration of about 5 to 40 mole percent.

8. The container of claim 1 wherein said container is a film formed from said polyester resin wherein said polyester resin comprises about 10 to 40 mole percent of said second diacid.

9. The container of claim 1 wherein said container is a molded container formed from said polyester resin wherein said polyester resin comprises about 10 to 20 mole percent of said second diacid.

10. A container formed from a polyester resin comprising the reaction product of
    (A) a diol component comprising ethylene glycol, and
    (B) a diacid component comprising
        (i) terephthalic acid and
        (ii) 1 to 50 mole percent, based on the total amount of diacid, of oxydiacetic acid,
wherein said polyester resin has an inherent viscosity of about 0.5 to 1.5.

11. A container former from a polyester resin comprising the reaction product of
    (A) a diol component comprising 1,4-butanediol, and
    (B) a diacid component comprising
        (i) terephthalic acid and
        (ii) 1 to 50 mole percent, based on the total amount of diacid, of oxydiacetic acid,
wherein said polyester resin has an inherent viscosity of about 0.5 to 1.5.

* * * * *